United States Patent
Belkin et al.

(10) Patent No.: US 7,133,516 B2
(45) Date of Patent: Nov. 7, 2006

(54) PREVENTION OF CALL FORWARDING LOOPS IN COMMUNICATION NETWORKS

(75) Inventors: Anatoly S. Belkin, Glenview, IL (US); Alex P. Hirsbrunner, Bloomingdale, IL (US); Jennifer A. Pierce, Algonquin, IL (US); Jheroen P Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 292 days.

(21) Appl. No.: 10/720,858

(22) Filed: Nov. 24, 2003

(65) Prior Publication Data

US 2005/0111649 A1    May 26, 2005

(51) Int. Cl.
*H04M 3/42* (2006.01)
(52) U.S. Cl. .............................. 379/211.02; 379/211.04; 455/417
(58) Field of Classification Search ............ 379/211.02, 379/211.04; 455/417
See application file for complete search history.

(56) References Cited

U.S. PATENT DOCUMENTS 6,167,256 A * 12/2000 Yla-Outinen et al. ....... 455/417
6,845,152 B1 * 1/2005 Taff et al. ............... 379/211.02

OTHER PUBLICATIONS

Bharatia, et al., Redirection Service Capability in SIP, Nov. 2001.

* cited by examiner

*Primary Examiner*—Wing Chan
*Assistant Examiner*—Thjuan P. Knowlin

(57) ABSTRACT

Circular call forwarding loops are prevented for a communications unit (12) capable of operating in a first communications network (14) and a second communications network (16) within a loosely coupled network (16), and respectively having a first network number and a second network number, as well as a first network voice mail. A call directed to the first network number (50) of the communications unit is forwarded to the second network number (52) of the communications unit when the communications unit is not operating in the first network. A first network voice mail number (P3) may be associated with calls so that calls are forwarded directly to the first network voice mail (56) when received again at the first network (54). Alternatively, if a call is subsequently received from the second communications network, and data of the subsequently received call matches data of the initial call, or if call forwarding indicia associated with the forwarded call is also associated with the subsequent call, the subsequent call is then forwarded to the first network voice mail of the communications unit.

8 Claims, 3 Drawing Sheets

PREVENTION OF CALL FORWARDING LOOPS IN COMMUNICATION NETWORKS

BACKGROUND OF THE INVENTION

1. Field of the Invention

The present invention relates generally to communication networks, and more particularly to forwarding communications between a two networks that together form a loosely coupled network.

2. Description of the Related Art

Loosely coupled networks including, for example, a Wireless Local Area Network (WLAN) supported by a WLAN server such as an enterprise server and a cellular Wide Area Network (WAN) supported by a mobile switching center (MSC) provide users with high-speed wireless Internet access, an inexpensive alternative to telephone services and other real-time applications. A wireless communications unit having dual mode capability can provide voice and data communication capabilities over the enterprise server when the communications unit is operating in the WLAN, and over the WAN when the communications unit is outside of the WLAN.

When such a dual-use or dual mode communications unit moves between WLAN and WAN coverage within the loosely coupled network, call forwarding may be used to route WLAN calls directed to the WLAN number of the communications unit to its cellular or WAN number, and vice versa. Under certain call conditions, such as when the communication unit is not available in, for example, the WLAN, the WLAN may execute call forwarding and send calls to another network, for example, the WAN. However if the WAN is also executing call forwarding and is unable to send the call to the communication unit and thus sends calls back to the WLAN, a call forwarding or circular call forwarding loop can be created.

Therefore, there is a need to resolve call forwarding loops in a wireless communications network created by call forwarding.

BRIEF DESCRIPTION OF THE DRAWINGS

The accompanying figures, where like reference numerals refer to identical or functionally similar elements and which together with the detailed description below are incorporated in and form part of the specification, serve to further illustrate preferred embodiments and to explain various principles and advantages in accordance with the present invention.

DETAILED DESCRIPTION OF THE PREFERRED EXEMPLARY EMBODIMENTS

Figure 1:
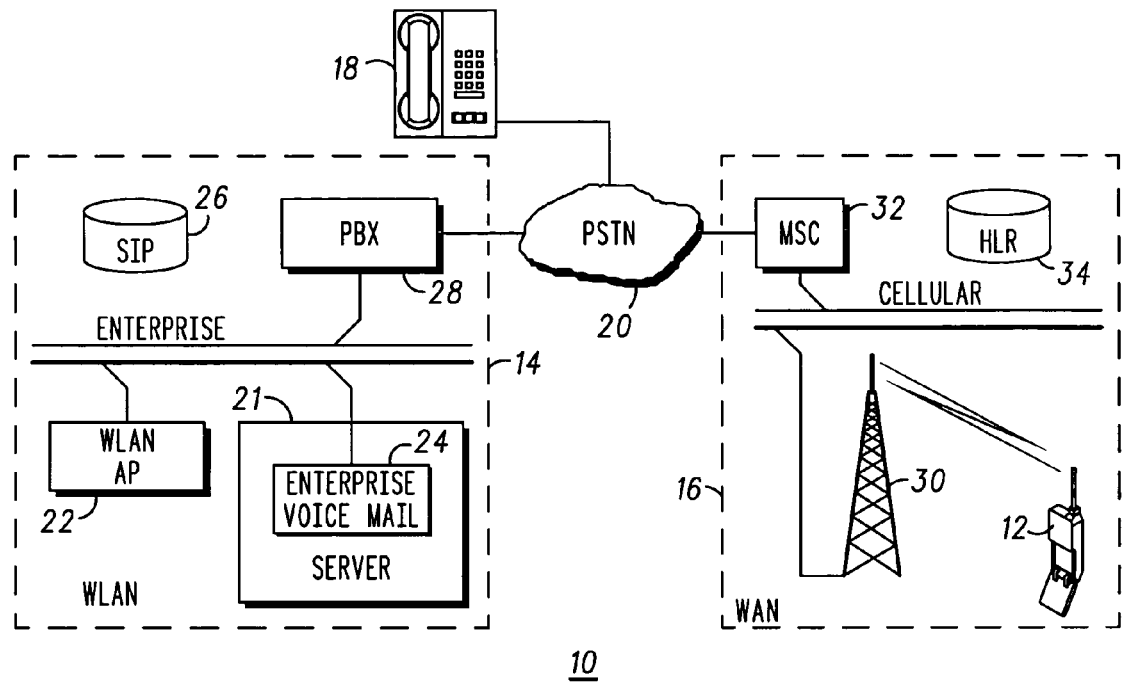
FIG. 1 depicts, in a simplified and representative form, an exemplary communications environment in which routines for preventing circular call forwarding loops according to the present invention are implemented.

In overview, the present disclosure concerns wireless communications devices or units, often referred to as communications units or subscriber units, such as cellular phones, two-way radios, wireless Local Area Network (LAN) units (stations, or STAs, in 802.1x specifications) and the like, and communications systems that provide services such as voice and data communications services to such communications units. More particularly, various inventive concepts and principles are embodied in systems, communications units, system access points, and methods therein for preventing circular forwarding loops, referred to more generally as call forwarding loops, created when communications units move between respective services of two wireless communications systems in a loosely coupled network. Note that the term communications unit may be used interchangeably herein with wireless subscriber device, subscriber device or subscriber unit, and each of these terms denotes a device ordinarily associated with a user. Examples of such units include personal digital assistants, personal assignment pads, personal computers equipped for wireless operation, cellular handsets or devices, or equivalents thereof.

The communications units that are of particular interest are dual-use or dual mode units capable of providing or facilitating both short range communications capabilities, normally referred to as WLAN capabilities, such as IEEE 802.11, IEEE 802.15, Bluetooth, or Hiper-Lan and the like, as well as conventional wireless communications capabilities, and that preferably utilize CDMA, frequency hopping, or TDMA access technologies and one or more of various networking protocols, such as Transmission Control Protocol/Internet Protocol (TCP/IP), protocols such as H.323 and Session Initiation Protocol (SIP) that support Voice Over Internet Protocol (Voice Over IP), Inter-Packet Exchange/Sequential Packet Exchange (IPX/SPX), Network Basic Input Output System (Net BIOS), GSM, UMTS, Wideband CDMA, or other protocol structures.

The instant disclosure is provided to further explain in an enabling fashion the best modes of one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring now to FIG. 1, a simplified and representative environment or system 10 in which resolution of call forwarding loops may occur will be discussed and described. The system 10 generally includes a loosely coupled network in which a dual mode or use first communications unit (first communications unit) 12 is capable of moving between services of or provided by a wireless local area network (WLAN) 14, or more generally a first communications network, and services of or provided by a cellular wide area network (WAN) 16, or more generally a second communications network, and in which a second communications unit 18 is capable of communicating with the first communications unit 12 through the Public Switched Telephone Network (PSTN) 20.

The first communications unit 12 has both a WLAN number, or more generally a first network number, P1 and a WAN number, or more generally a second network number, P2. Also, while the term "number" will be used throughout, those skilled in the art will appreciate that "number" also refers more broadly to any user identity, such as an IP address, Session Initiation Protocol (SIP) URI or a fixed or a wireless line number depending on the particular communications unit with which the user identity is associated.

The second communications unit 18 may be any type of communications unit such as, for example, a legacy cellular device capable of communicating over the WAN 16, or a legacy, wired or Internet Protocol (IP) device capable of communicating over the WLAN 14. However, for purposes of discussion, the second communications unit 18 will generically be described and shown as a device attempting to establish communication with the first communications unit 12 through the PSTN 20.

Further, while the system 10 shows a loosely coupled network formed by the WLAN 14 and the WAN 16, the loosely coupled network may consist more generally of any two communications networks in which a dual mode communications unit is operable and in which circular call forwarding loops may be created as a result of the dual-mode communications unit moving between respective service areas of the WLAN 14 and the WAN 16. Such loosely coupled networks may be formed by, for example, home and cellular networks, home and office networks, office and cellular networks, office and office networks, home and home networks, an email network coupled to any of the aforementioned networks, or a multi-media network coupled to any of the aforementioned networks.

The WLAN 14 includes an enterprise server 21 that is coupled to one or more access points, such as the WLAN access point (WLAN AP) 22, and that provides enterprise voice mail 24 for the first communications unit 12. Preferably, and as is well known in the art, the WLAN 14 uses the Session Initiation Protocol (SIP) for call setup and call control and contains a SIP registrar 26, which is a database for tracking the location of the first communications unit 12 when the first communications unit 12 is operating in the WLAN 14 in WLAN mode, and which may be stored within, or separately from, a Private Branch Exchange (PBX), or network switch or switching function 28. Alternatively, the WLAN 14 may use legacy telephony protocols for call setup and call control. The PBX 28, which is for switching calls within the WLAN 14 as is well known in the art, also implements or facilitates various embodiments of call forwarding loop resolution routines in a manner described below in more detail.

The WAN 16 includes well known components including one or more cellular base transmitter sites (BTSs) such as the BTS 30, as well as a mobile switching center (MSC) 32. The BTS 30 provides cellular WAN coverage that may or may not overlap the coverage provided by the WLAN 14. In addition, the WAN 16 includes a conventional Home Location Register (HLR) 34, which is a database that may be stored within, or separately from, the MSC 32, and which is for tracking the location of the first communications unit 12 when the first communications unit 12 is operating in cellular, or WAN, mode in the WAN 16 as is well known in the art.

Figure 2:
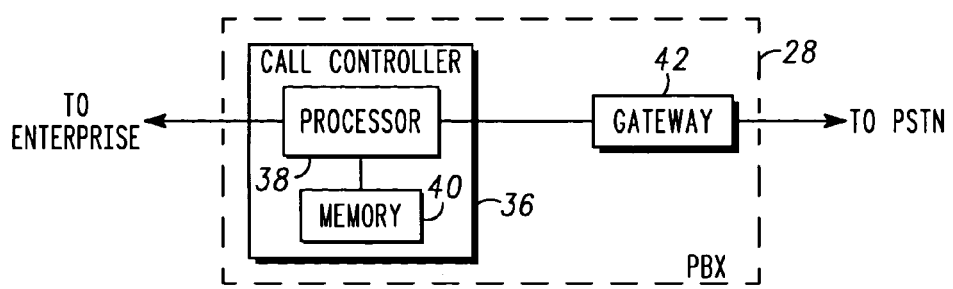
FIG. 2 is a more detailed block diagram of the private branch exchange (PBX) shown in FIG. 1.

As shown in more detail in FIG. 2, the PBX 28 includes a call controller, or controller, 36 such as, for example, an Avaya MultiVantage™ controller that sets up calls for a gateway 42 and that includes a processor 38 and a corresponding controller memory 40. The gateway 42 switches voice and data traffic and connects the WLAN AP 22 to the PSTN 20 through the PBX 28 as is well known in the art. Alternatively, the gateway could be any switching component or mechanism such as, for example, a series of relays or digital switches. The controller memory 40 is programmed to include a PBX operating system, software routines, such as, for example, packet data switching or routing routines, trunked circuit switching or routing routines, and many, or all, of the novel routines and functionality necessary for the processor 38 to resolve circular call forwarding loops within the system 10 as will be discussed below in more detail.

It should be noted that the WLAN, or first network, 14 stores both the WLAN number, or the first network number, P1 and the corresponding WAN number, cellular number, or second network number, P2 of the first communications unit 12. This information is preferably stored at the PBX 28. The WLAN 14 can obtain this information via provisioning, from the SIP registrar 26, or from the first communications unit 12. The WLAN 14 can use this information when it receives a call for the first communications unit 12 on P1 that cannot be delivered in the WLAN 14, to forward the call to the WAN 16 on the second network number, P2.

It further should be noted that the routines and functionality for preventing circular call forwarding loops within the system 10 or within any loosely coupled network may be implemented completely or in part through hardware, software, or a combination of both at locations within the system 10 other than just the PBX 28. Alternative locations may include, for example, the PSTN 20, the MSC 32 or any other location having the necessary switching and server functionality.

The WLAN, or first network, 14 may use one of several methods to associate calls with a forwarding number for the second number of the communications unit 12 in the WAN, or second network 16. These methods result in the programming of forwarding information, such as a forwarding number, for the WAN number P2 of the first communications unit 12 into the MSC 32. The forwarding information may consist of unconditional forwarding information, such as an Unconditional Call Forwarding number (CFU) and/or conditional call forwarding information. Conditional forwarding information can be a Call Forwarding number to be used by the MSC 32 when it determines that the first communications unit 12 is Busy in the WAN 16 (CFB) or a Call Forwarding number to be used when the first communications unit 12 is Not Reachable or does Not Reply in the WAN 16 (CFNR).

One method for the WLAN 14 to associate calls with a forwarding number is for the WLAN 14 to provide the forwarding information or forwarding number to the first communications unit 12 while the first communications unit 12 is operating in the first network. The first communications unit 12 thus receives at least one forwarding number and stores or retains the at least one forwarding number in, for example, internal memory. The first communications unit 12 is programmed to manipulate forwarding information in the MSC 32 when it enters and leaves the WAN 16. Preferably the WLAN 14 or other entity provides both a conditional forwarding number and an unconditional forwarding number.

In some embodiments the first communications unit 12 is programmed to manipulate forwarding information as follows. When the first communications unit 12 enters the WAN 16 and starts operation in the WAN 16, it requests the MSC 32 to clear any unconditional forwarding information or number the MSC 32 has stored for the WAN number P2 of the first communications unit 12. The first communications unit 12 also requests the MSC 32 to set conditional forwarding information or number for the WAN number P2 to the conditional forwarding number previously provided by the WLAN 14. When the first communications unit 12 leaves the WAN 16, prior to terminating operation in the WAN 16, the first communications unit 12 requests the MSC 32 to set the unconditional forwarding information or number for the WAN number P2 to the unconditional forwarding number previously provided by the WLAN 14.

Another method for the WLAN 14 to associate calls with a forwarding number is for the WLAN 14 to use a web interface or another interface into the MSC 32 of the second network so that it can directly manipulate the forwarding information in the MSC 32. Typically this would be done by an entity in the WLAN 14, such as the PBX 28, that can detect whether a first communications unit 12 is entering or leaving the WLAN 14. Preferably the WLAN 14 has both a conditional forwarding number and an unconditional forwarding number for the first communications unit 12.

The WLAN 14 manipulates forwarding information as follows. When the WLAN 14 detects that the first communications unit 12 leaves the WLAN 14, and thus may enter the WAN 16, it requests the MSC 32 to clear any unconditional forwarding number the MSC 32 has stored for the WAN number P2 of the communications unit 12. The WLAN 14 also requests the MSC 32 to set the conditional forwarding number or numbers for the WAN number P2 to the conditional forwarding number for first communications unit 12. When WLAN 14 detects that the first communications unit 12 enters the WLAN 14 and thus may leave the WAN 16, it requests the MSC 32 to set the unconditional forwarding number for the WAN number P2 to the unconditional forwarding number for first communications unit 12. Direct manipulation by the WLAN 14 of forwarding information for a WAN number P2 at an MSC may require that the WLAN 14 knows security information like passwords and user IDs used between the first communications unit 12 with P2 and the MSC 32.

As a result of associating calls with a forwarding number, calls directed to the WAN number P2 of the first communications unit 12 will be forwarded by the MSC 32 to the unconditional forwarding number after first communications unit 12 has left the WAN 16, calls directed to the WAN number P2 while the first communications unit 12 is operating in the WAN 16 and can be reached in the WAN 16 will not be forwarded but be directed to the first communications unit 12 via the WAN 16, and calls directed to the WAN number P2 while the first communications unit 12 is operating in the WAN 16 but can not be reached in the WAN 16 because it is Busy or does not reply, will be forwarded to the conditional forwarding number. A typical choice for the unconditional call forwarding number, CFU, is the enterprise, or WLAN 14, number P1. Typical choices for a conditional call forwarding number, CFB/CFNR, is the enterprise, first network, or WLAN, number P1 or a voice mail number that terminates in the WLAN 14. The voice mail number would only be used if the first communications unit 12 has a first network voice mail 14 that has a separate number that is different from the number P1.

Referring now to FIGS. 3–7, with reference also being made throughout to FIGS. 1 and 2, several routines for preventing circular call forwarding loops will now be described. It is assumed throughout the discussion of these routines that the first communications unit 12 is not operating in enterprise, or WLAN, mode and is therefore either operating in cellular, or WAN, mode in the WAN 16 or is not operating at all, such as when, for example, it is switched off by its user. Further, it is assumed that the first communications unit 12 is programmed with or recognizes both an enterprise, or WLAN, number P1 and a cellular, or WAN, number P2. It is also assumed that, unless otherwise indicated, the second communications unit 18 initially makes a call to the enterprise number P1 of the first communications unit 12 through a hardwire PSTN line, and that the first communications unit 12 may be busy, for example, with another call or may not be reachable by the WAN 16.

However, it should be appreciated that the configuration shown in FIG. 1 is exemplary in nature only, and that the following routines are applicable in any loosely coupled network scenario in which a communications unit places a call to an IP, cell or fixed line number of another communications unit, and in which the call is forwarded by one network to the other communications unit via a different network, regardless of the respective system or network locations of the units and the unit types. Further, it should be appreciated that, while the operability of the PBX 28 will be discussed generally in terms of the PBX 28, the functionality of the PBX 28 is programmed into the controller memory 40, which in turn controls the operation of the processor 38.

Figure 3:
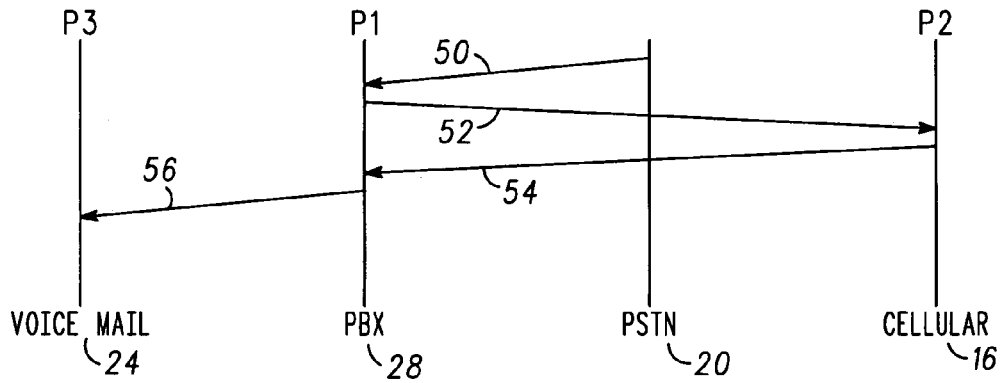
FIG. 3 is a ladder diagram illustrating a first routine for preventing circular forwarding loops.

FIG. 3 illustrates a first routine for preventing circular call forwarding loops through use of a separate voice mail number for the first communications unit 12. At 50, the second communications unit 18 initiates a call to the enterprise (WLAN) number P1 of the first communications unit 12. However, at 52, the PBX 28 determines that the first communications unit 12 is not operating in the WLAN 14 and forwards the call to the cellular (WAN) number P2 of the first communications unit 12.

In addition, prior to, concurrent with, or subsequent to the forwarding of the call at 52, the WLAN 14 associates calls directed to the cellular number P2 with a call forwarding number that is, for example, a personal voice mail number P3. The number P3 terminates on the WLAN 14 and in particular on the PBX 28. Therefore, when the first communications unit 12 is incapable of accepting the call via the WAN 16 due either to a conditional call forwarding scenario (i.e. call busy, not reachable, no reply, deflection during alerting, or deflection immediate response) or unconditional call forwarding scenario (i.e. the MSC 32 is instructed to forward any call to the first communications unit 12 without ringing the first communications unit 12 and without looking at the state of the first communications unit 12), the MSC 32 will forward the call to the call forwarding number, which in this case is equal to the voice mail number P3. It should be understood that equality for phone numbers allows for differences, such as the presence or absence of country codes, area codes, brackets, blanks and dashes that do not impact the routing of a call to the phone number.

At 54, the PBX 28 receives the call on the voice mail number P3 from the WAN 16. At 56, as the call is switched through the gateway 42, the PBX 28 detects that the personal voice mail number P3 is a voice mail number and forwards the call to the a voice mail box associated with the voice mail number P3 in the WLAN voice mail 24 of the first communications unit 12. Once the PBX 28 forwards the call to the WLAN voice mail 24, the routine ends.

Figure 4:
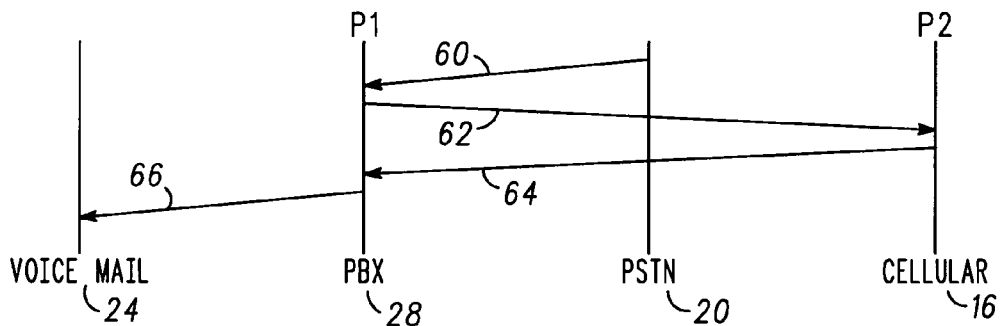
FIG. 4 is a ladder diagram illustrating a second routine for preventing circular forwarding loops.

FIG. 4 illustrates a second routine for preventing circular call forwarding loops through use of identification data, such as caller ID, corresponding to the call to the first communications unit 12. At 60, the second communications unit 18 initiates a call to the enterprise (WLAN) number P1 of the first communications unit 12. However, at 62, the PBX 28 determines that the first communications unit 12 is not operating in the WLAN 14 and forwards the call to the cellular number P2 of the first communications unit 12. In addition, prior to, concurrent with, or subsequent to the forwarding of the call at 62, the WLAN 14 associates calls directed to the cellular number P2 with a forwarding number that is equal to the WLAN number P1 of the first communications unit 12. At 64, the PBX 28 receives the call or another call directed to, for example, the enterprise number P1 back from the WAN 16 because of the forwarding number being equal to P1, thus a predetermined call forwarding condition exists. More specifically, the controller memory 40 of the PBX 28 applies a call looping prevention precaution and stores first identification data, for example caller identification data, of any incoming call for the first communications unit 12 at least when the first communications unit 12 is not operating in the WLAN 14, and in particular a first caller ID for the call initiated at 60, and then either compares the first identification data or caller identification data of the call with the second identification or caller identification data or stores second caller identification data of the call when at 64 it receives another call from the WAN 16.

Subsequently, at 66 the PBX 28 forwards the call to the WLAN voice mail 24 of the first communications unit 12 if the comparing the first identification data and the second identification data indicates a call forwarding loop. In some embodiments when the first caller identification data matches the second caller identification data thus indicating a call forwarding loop the second call is forwarded to the voice mail 24, and the routine then ends. It should be noted that this second routine would enable a third caller with a caller ID different from that of the caller at the second communications unit 18 to call the enterprise number P1 and to have the call to the enterprise number P1 properly forwarded to the cellular number P2.

Note that the forwarding number may also be a third network number P1' that terminates on the WLAN and acts for example as a marker number or alternative number for the communication unit in the WLAN. When a call is directed to the third network number it can be forwarded to the first network voice mail or alternatively if the communication unit is operating in the WLAN forwarded to the communication unit. This presents the relative advantage of having these calls sent to the voice mail without having to determine where they came from. There is also the issue of using relatively more numbers that terminate or are routable to the WLAN or first network. If these numbers are only used for temporary routing situations the PBX 28 can temporarily assign the number to a communication unit for purposes of calls that are routed back from the second network and re-assign the number to other units once the communication unit is again operating in the WLAN or first network.

Figure 5:
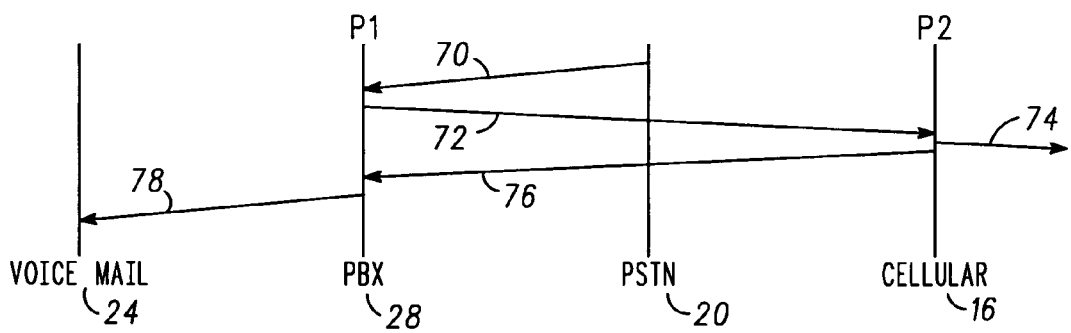
FIG. 5 is a ladder diagram illustrating a third routine for preventing circular forwarding loops.

FIG. 5 illustrates a third routine for preventing call or circular call forwarding loops that uses identification data corresponding to calls, more specifically through addition of loop indicia, and more specifically a call prefix or suffix, to the caller identification data for the call intended for the first communications unit 12. At 70, the second communications unit 18 initiates a call to the enterprise (WLAN) number P1 of the first communications unit 12. The PBX 28 then retrieves caller identification data for this call. However, at 72, the PBX 28 determines that the first communications unit 12 is not operating in the WLAN 14 and forwards the call to the cellular number P2 of the first communications unit 12. Also, at 72 the controller 38 applies a call looping prevention precaution and constructs identification data for the forwarded call by adding loop indicia, such as a prefix, which may be, for example, 999 or the like, to the caller identification data retrieved for the call at 70 and stores the result, for example in the forwarded call, e.g. by including the loop indicia with caller identification data in a call setup message for the call. Typically, the identification data, e.g. the call setup message, will be transmitted with the call in accordance with the specific communications protocol being used between the PBX 28 and the cellular network, or WAN 16. In addition, prior to, concurrent with, or subsequent to the forwarding of the call at 72, the WLAN 14 associates calls directed to the cellular number P2 with a forwarding number that is equal to the WLAN number P1 of the first communications unit 12.

At 74, if the call is to be forwarded to the first communications unit 12, the MSC 32 must be programmed to remove the prefix or suffix added to the caller identification data prior to the call being forwarded, or the first communications unit 12 must be programmed to remove the prefix or suffix prior to displaying caller identification data to the user. At 76, if the MSC 32 does not forward the call to the first communications unit 12, but rather sends the call back to the PBX 28 on the enterprise number P1 thus resulting in a predetermined call forwarding loop condition, the processor 38 checks for the loop indicia corresponding to the call returned from the MSC 32 and compares this to the loop indicia for the call that was originally forwarded to the WAN. When a match is found indicating the call forwarding loop, at 78, the PBX 28 forwards the call to the WLAN voice mail 24 of the first communications unit 12. Note that when one prefix or suffix is used this amounts to the processor 38 determining whether that prefix or suffix is present. If the prefix or suffix is detected, this indicates that the first communications unit 12 is incapable of accepting the call in the WAN due either to a conditional or unconditional call forwarding scenario. The routine then ends.

Figure 6:
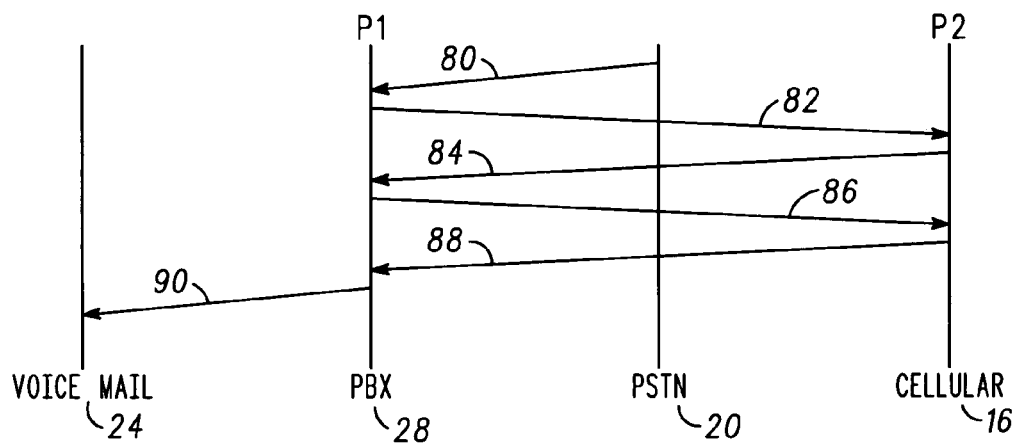
FIG. 6 is a ladder diagram illustrating a fourth routine for preventing circular forwarding loops.

FIG. 6 illustrates a fourth routine for preventing circular call forwarding loops through use of identification data, specifically a predetermined limit on the number of call appearances at the first communications unit 12. This predetermined limit in some embodiments is set at two, e.g. one active call and one call on hold for example. However, the limit may be set according to specific network operating parameters.

At 80, the second communications unit 18 initiates a call to the enterprise (WLAN) number P1 of the first communications unit 12. However, at 82, the PBX 28 determines that the first communications unit 12 is not operating in the WLAN 14 and forwards the call to the cellular number P2 of the first communications unit 12. In addition, prior to, concurrent with, or subsequent to the forwarding of the call at 52, the WLAN 14 associates calls directed to the cellular number P2 with a forwarding number that is equal to the WLAN number P1 of the first communications unit. Also, at 84 the PBX 28 applies a call looping prevention precaution and checks and determines that the call that is being forwarded to the first communications unit 12 is a call appearance for the first communications unit 12. The PBX retrieves a stored tracked number of call appearances and increments and stores the revised tracked number of call appearances for the first communications unit 12 that is known to the PBX 28. Note that a typical communications unit can only handle two simultaneous call appearances, such as one active call and one on hold call. As is well known in the art, the PBX 28 would be notified when the first communications unit 12 terminates a forwarded call, and therefore it can determine the duration of the forwarded call and can estimate the number of call instances or appearances that would be active at the first communications unit 12 due to the successfully forwarded call. In particular, when the PBX 28 is notified that a forwarded call it terminated, the PBX 28 will decrement the number of call appearances for the first communications unit 12 that is known to the PBX 28.

At 84, the PBX 28 receives the call back from the WAN 16 because a predetermined call forwarding condition exists. At 84, the call appears to the PBX 28 as an incoming call for the enterprise number P1, and the PBX 28 does not attempt to determine whether the call at 84 is related to the call at 80. Rather, at 86, the PBX 28 again determines that the first communications unit 12 is not operating in the WLAN 14 and again forwards the call to the cellular number P2 of the first communications unit 12 because it does not yet detect a call forwarding loop condition. At 88, the call again appears to the PBX 28 as an incoming call for the enterprise number P1, and the PBX 28 does not attempt to determine whether the call at 84 is related to the calls at 80 or 84. However, either at 86 or 88 the PBX 28 checks and determines that there are now two forwarded call appearances for the first communications unit 12. If two call appearances is the predetermined limit for the number of allowed call appearances at the first communications unit 12, the PBX 28 forwards the call to the voice mail 24 of the first communications unit 12. Basically the PBX stores a tracked number of call appearances at the communication unit, increments this tracked number with each call that is forwarded and at some point by comparing the tracked number of appearances to the limit determines that the limit is satisfied thus indicating a call forwarding loop or at least no reason to forward additional calls to the communication unit, and therefore forwards the call to the first network voice mail of the communication unit. The routine then ends.

It should be noted at this point that the PBX 28 is programmed to learn when the call to the voice mail 24 ends. Subsequently, the PBX 28 terminates the call, shown at 88, and informs the MSC 32. The MSC 32 in turn ends the call started at 86 and informs the PBX 28. The PBX 28 ends the call started at 84 and informs the MSC 32. The MSC 32 then ends the call started at 82 and informs the PBX 28, which in turn ends the call started at 80.

Figure 7:
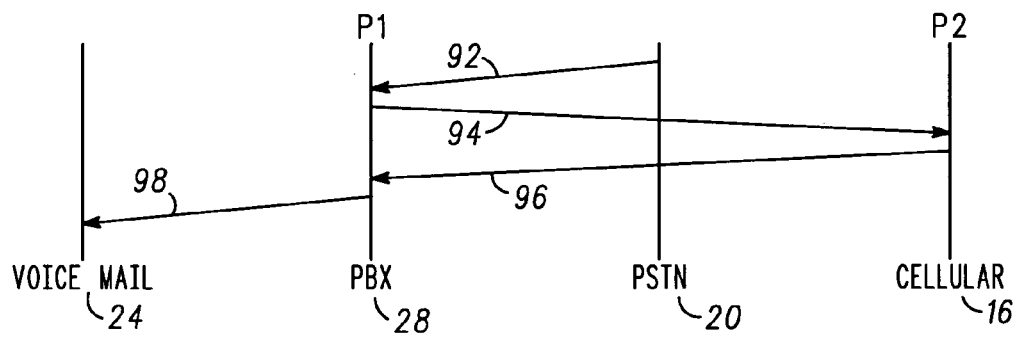
FIG. 7 is a ladder diagram illustrating a fifth routine for preventing circular forwarding loops.

FIG. 7 illustrates a fifth routine for preventing circular call forwarding loops through use of a Mobile Subscriber Integrated Services Directory Number (MSISDN) data set, or data, in association with the call to the first communications unit 12. As is well known in the art, MSISDN data is data associated with a call initiated in a network supported by, for example, Integrated Services Directory Number Primary Rate Interface (ISDN PRI) protocol, Q.931 protocol, Signaling System No. 7 ISDN User Part (SS7 ISUP) protocol, or any other protocol that carries this type of data. The MSISDN data identifies caller, callee and redirect phone numbers such as the Called Party Number (CdPN), Calling Party Number (CgPN), Original Called Number (OCN) and Redirecting Number (RGN, which is the number from which the call was last redirected or forwarded).

At 92, the second communications unit 18 initiates a call to the enterprise (WLAN) number P1 of the first communications unit 12. However, at 94, the PBX 28 forwards the call to the WAN number P2 of the first communications unit 12 because the first communications unit 12 is not operating in the WLAN 16. Also, at 94 the processor 38 of the PBX 28 includes in the forwarded call one or all of the CgPN, which is the number of the second communications unit 18; the OCN, which is the enterprise number P1 of the communications unit 12,; and the RGN, which is the enterprise number P1 of the first communications unit 12. In addition, prior to, concurrent with, or subsequent to the forwarding of the call at 94, the WLAN 14 associates calls directed to the cellular number P2 with a forwarding number that is equal to the WLAN number P1 of the first communications unit 12. At 96, the MSC 32 redirects the call back to the PBX 28 on the enterprise number P1 when a predetermined call forwarding condition exists. Also, at 96 the MSC 32 includes in the redirected call one or all of the CgPN, which is the number of the second communications unit 18; the OCN, which is the enterprise number P1 of the first communications unit 12; and the RGN, which is the WAN number P2 of the first communications unit 12. At 98, the PBX 28 then determines MSISDNs that may be present in the received call. At 98, the PBX 28 forwards the call to the voice mail 24 of the first communications unit 12 when an RGN is present in the received call and the RGN is equal to the cellular number P2 corresponding to the enterprise number P1 on which the call is received, thereby indicating that a circular call forwarding loop exists. It should be appreciated by those skilled in the art that the PBX 28 will inspect any received call, including the call at 92, for the enterprise number P1, but no RGN would likely be present because the call at 92 is an original call. The routine then ends.

At this point it should also be noted that the PBX 28 can also trigger call forwarding to the voice mail 24 by storing the OCN for every call currently being forwarded for the enterprise number P1 and analyzing each OCN in each received call for the enterprise number P1. The PBX 28 will then forward a call to the voice mail 24 when it detects that a received OCN and a stored OCN match or when the OCN is equal to the second network number P2.

Figure 8:
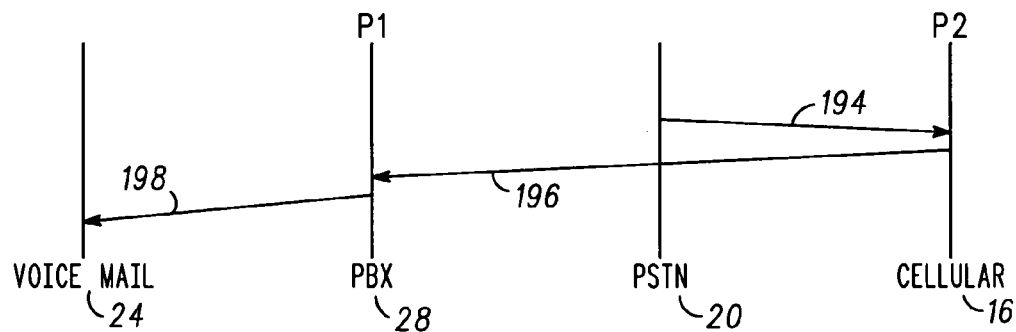
FIG. 8 is a ladder diagram illustrating a sixth routine for preventing circular forwarding loops.

Further to the MSISDN data set discussed above in connection with FIG. 7, FIG. 8 illustrates a sixth routine for preventing circular call forwarding loops by forwarding a call to the first communications unit 12 operating in the WLAN 14 through use of an OCN or RNG at the PBX 28 prior to receipt of the original call at the PBX 28. Specifically, at 194, the second communications unit 18 initiates a call to the cellular (WAN) number P2 of the first communications unit 12. At 196, the MSC 32 redirects the call to the PBX 28 on the enterprise number P1 when a predetermined call forwarding condition exists. Also, at 196 the MSC 32 includes in the redirected call one or all of the CgPN, which is the number of the second communications unit 18, the OCN, which is the WAN number P2 of the first communications unit 12; and the RGN, which is the WAN number P2 of the first communications unit 12. Optionally, prior to the reception of the call at 198, the WLAN 14 associates calls directed to the cellular number P2 with a forwarding number that is equal to the WLAN number P1 of the first communications unit 12. At 198, upon receiving the forwarded call, the PBX 28 then determines MSISDNs that may be present in the received call, and forwards the call to the voice mail 24 of the first communications unit 12 when an RGN is present in the received call and the RGN is equal to the cellular WAN number P2 corresponding to the enterprise WLAN number P1 of the number P1 on which the call is received and when it determines that the first communications unit 12 is not operating in the WLAN 14, thereby indicating that a circular call forwarding loop possibly exists. Alternatively, the PBX 28 may determine that an OCN is present in the received call and the OCN is equal to the cellular WAN number P2 corresponding to the enterprise WLAN number P1, thereby indicating that a circular call forwarding loop possibly exists. The routine then ends once the call is forwarded to the voice mail 24.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method of preventing circular call forwarding loops for a communications unit capable of operating in a first network and a second network within a loosely coupled network, and respectively having a first network number and a second network number, as well as a first network voice mail, the method comprising:
   receiving a call directed to the first network number of the communications unit;
   adding first loop indicia to caller identification data in the call;
   storing first identification data corresponding to the call upon determining that the communications unit is not operating in the first network;
   forwarding the call to the second network number of the communications unit;
   receiving another call having second identification data for the communications unit subsequent to the forwarding of a call to the second network number of the communications unit;
   checking for other loop indicia corresponding to another call;
   comparing the other loop indicia corresponding to the another call with the loop indicia added to the call and the second identification data with the first identification data; and
   forwarding the call to the first network voice mail of the communications unit when the comparing the other loop indicia corresponding to the another call with the loop indicia added to the call and the second identification data with the first identification data indicates a call forwarding loop.

2. The method of claim 1 wherein the storing the first identification data comprises storing caller identification data for the call and the comparing comprises comparing other caller identification data for the another call with the caller identification data for the call and when a match is found indicating the call forwarding loop, forwarding the call to the first network voice mail of the communications unit.

3. The method of claim 1 wherein the first and the other loop indicia comprises one of a prefix and a suffix for the caller identification data, the prefix and suffix having a predetermined number sequence.

4. The method of claim 1 wherein the storing the first identification data comprises storing a tracked number of call appearances at the communications unit; the comparing comprises incrementing the tracked number of call appearances and determining when a predetermined limit for call appearances is satisfied; and when the predetermined limit is satisfied indicating the call forwarding loop, forwarding the call to the first network voice mail of the communications unit.

5. A network switch, comprising:
   a switching mechanism for switching voice and data traffic and for connecting an enterprise network to a cellular network through a publicly switched telephone network;
   a controller in communication with the switching mechanism for setting up calls for the switching mechanism, the controller including a processor and a controller memory that is programmed to enable the processor:
   to forward an enterprise call, which is directed to a communications unit enterprise number, to a corresponding communications unit cellular number in the cellular network;
   add first loop indicia to first identification data in the enterprise call
   to initially store first identification data corresponding to the enterprise call,
   to check for other loop indicia corresponding to a subsequent call
   to compare the other loop indicia and the second identification data corresponding to a the subsequent call received by the switching mechanism from the cellular network with and first loop indicia and the first identification data, and
   to forward the subsequent call to an enterprise network voice mail when the other loop indicia compared to the first loop indicia and the second identification data compared to the first identification data indicate a call forwarding loop.

6. The network switch of claim 5 wherein the processor to store the first identification data farther is enabled to store caller identification data for the enterprise call and to compare comprises comparing other caller identification data for the subsequent call with the caller identification data for the enterprise call and when a match is found indicating the call forwarding loop, forwarding the call to the enterprise network voice mail of a communications unit.

7. The network switch of claim 5 wherein the loop indicia comprises one of a prefix and a suffix for the caller identification data, the prefix and suffix having a predetermined number sequence.

8. The network switch of claim 5 wherein to store the first identification data comprises to store a tracked number of call appearances at a communications unit; to compare comprises incrementing the tracked number of call appearances and determining when a predetermined limit for call appearances is satisfied; and when the predetermined limit is satisfied indicating the call forwarding loop, forwarding the call to the first network voice mail of the communications unit.

* * * * *